Aug. 24, 1965 R. A. CURRAN 3,202,591
METHOD OF MAKING AN ELECTRIC CIRCUIT STRUCTURE
Filed Nov. 24, 1961 2 Sheets-Sheet 1
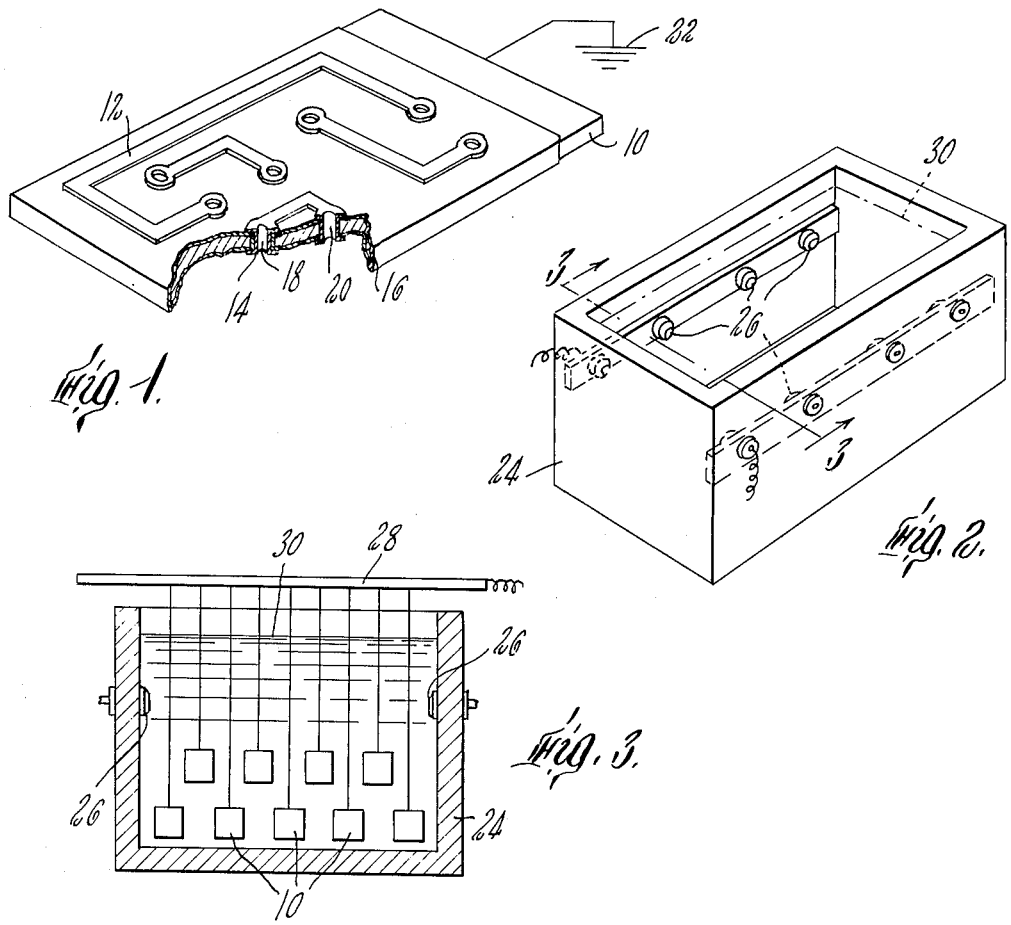
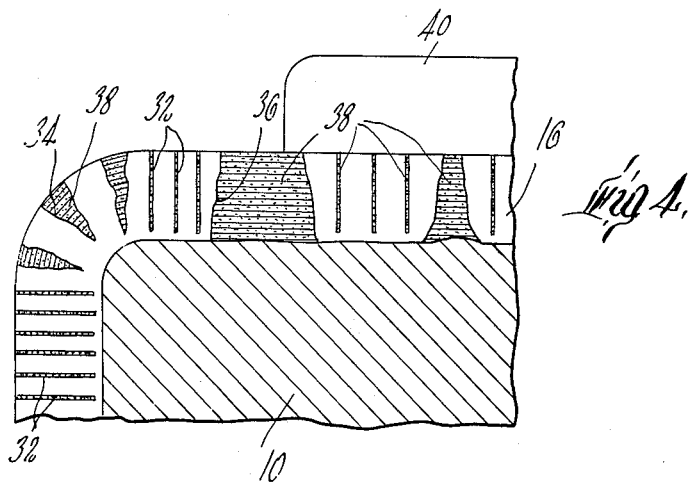

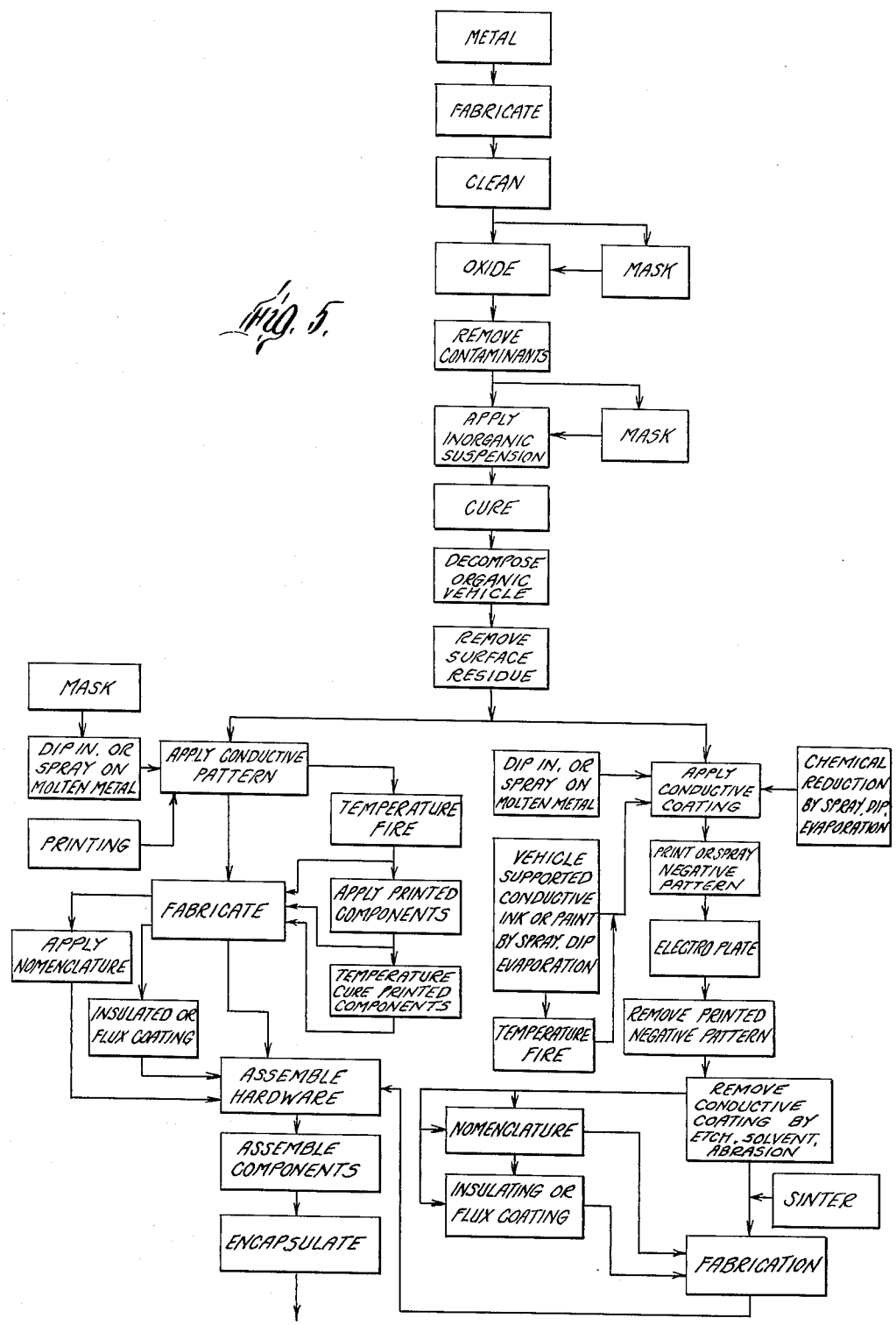

United States Patent Office 3,202,591
Patented Aug. 24, 1965

3,202,591
METHOD OF MAKING AN ELECTRIC
CIRCUIT STRUCTURE
Robert A. Curran, Wayland, Mass., assignor to Electralab
Printed Electronics Corporation, Needham Heights,
Mass., a corporation of Massachusetts
Filed Nov. 24, 1961, Ser. No. 154,505
7 Claims. (Cl. 204—38)

This application is a continuation-in-part of application Serial No. 71,618, filed November 25, 1960, now abandoned.

This invention relates to structural articles having oxide coatings and to methods of providing improved oxide coatings on such articles.

Structural articles of the type to which the invention relates may be provided with an oxide coating by anodic oxidation of such parts in an acid electrolyte such as chromic, sulphuric or oxalic acid. Generally, the tank is made the cathode by connection to the negative side of a D.C. current source and the workpieces are made into the anode by connecting them to the positive side of the D.C. current source. While oxide coatings may be formed on several metals by this process, aluminum and its alloys are particularly useful and suitable processes of this general type for producing hard coatings of aluminum oxide are described in U.S. Patents No. 2,743,221 and No. 2,897,125. While such coatings are harder and substantially more resistant to abrasion than the metal from which they are formed, the coatings appear to be inherently porous due to the electrolytic mechanism by which they are formed and although the pores are minute (less than one micron in diameter) they are large enough to permit the entrance of water and aqueous solutions of some substances and therefore the layer is not completely corrosion resistant, nor does it have good electrical characteristics although the oxide material itself has excellent dielectric qualities. In fact, the oxide layer often appears to be equivalent to a complete electrical short apparently due to the presence of the pores which continue to act as electrical conductors as they did during the oxide forming operation. Other flaws due to surface irregularities and crazing defects also contribute to the imperfections of the oxide coating. It is, therefore, a general object of the invention to improve various properties of electrolytically formed oxide coatings; and more specifically to provide an improved oxide coated structural article in which the inherent defects due to pores and flaws of the oxide layer are overcome to provide a substantially impervious coating without masking or otherwise impairing the advantageous structural features of the oxide layer, and novel methods of providing such improved coated articles.

While such oxide coated articles have general utility they have particular advantage when employed as printed circuitry supports in which electrical circuit wiring may be disposed on oxide coated metal substrates by mass production methods provided their electrical imperfections are satisfactorily cured. The oxide insulated metal base is a substantially superior material for printed circuitry use than either frangible supports such as glass, mica, porcelain and other ceramics, or resin impregnated fiberboard constructions that have been heretofore utilized.

In the printed circuitry industry it is often desired to employ tough support structures at temperatures far above those temperatures at which the resin impregnated materials fail. For example, a desirable circuit material is a conductive metallic ink which requires a firing temperature in excess of 1000° F. If the metallic ink is not fired to that temperature the conductive circuit configurations dissolve into solder during subsequent processing. Therefore, the use of such metallic inks is precluded in conjunction with substrates that include any organic material.

Accordingly, it is a further object of this invention to provide an improved printed circuit construction which is inherently capable of being fabricated by easier methods and in a more versatile manner, and which involves in many cases savings of material and greater versatility in use.

Another object of the invention is to provide a novel substrate for general electrical circuitry use comprising a self-supporting metal base having a porous, electrolytically formed insulating layer of oxide thereon with a complementing insulation disposed in the pores and flaws of the oxide only that overcomes the porosity defects without imposing temperature limitations under which the circuitry may be used.

Still another object of the invention is to provide an improved printed circuit component which utilizes fired metallic inks as electrical circuit elements.

A further object of the invention is to provide improved methods of printed circuit manufacture; and a related object is to provide a novel method of fabricating insulated printed circuitry substrates suitable for high temperature use.

In accordance with principles of the invention a structural article of a metal, after fabrication in accordance with the intended end use, is provided with a hard but porous oxide layer electrolytically formed on its surface. This layer is treated to dispose in the pores and other flaws of the layer particles of a non-conductive inorganic material so that both the structural and the electrical defects of the oxide layer are cured. In accordance with the preferred embodiment of the invention this particle disposition is formed by employing a solution of silicone resin in which finely divided mica is suspended. This suspension is sprayed on the surface of the oxide coating and the article is heated to a temperature which is sufficient to drive off the waters of crystallization of the mica and to gel the silicone. While the mechanism of this operation is not fully understood, it is believed this initial conversion stabilizes the mica within the pores and flaws of the oxide film. The coated article then is heated to 1000° F. at which temperature the silicone degrades at an appreciable rate with its organic components being released so that the mica-silica residue is secured in the pores and flaws, adhering both to the base metal and to the walls of the pores and flaws. The mica-silica residue on the surface of the oxide layer after treatment at this elevated temperature is easily brushed off so that the entire original oxide surface is exposed.

Thus the invention provides a novel structural article characterized by an impervious layer, the principal component of which is an electrolytically formed metal oxide having outstanding dielectric and corrosion resistance qualities. The layer is further characterized by the exposed oxide surface to which deposited metallic ink patterns may be securely bonded. As the oxide layer contains inorganic materials only the thermal limits of this structure permit high temperature assembly techniques such as brazing, silver soldering and welding to be employed without impairing its electrical characteristics. The thin layer (in the order of a few thousandths of an inch in thickness) closely conforms to the fabricated configuration of the metal base and is dimensionally stable. Also the layer may be selectively applied to the metal if so desired.

The versatility of such oxide coated metal structures affords substantial advantages both in use and in subsequent processing and other objects, features and advantages of the invention will be seen as the following description of embodiments of the invention progresses, in conjunction with the drawings, in which:

FIG. 1 is a perspective view of an aluminum chassis bearing an exemplary printed circuit configuration constructed in accordance with principles of the invention;

FIG. 2 is a schematic view of a suitable tank in which the oxide layer is electrolytically formed in accordance with principles of the invention;

FIG. 3 is a generally schematic vertical sectional view through the tank taken along the line 3—3 of FIG. 2;

FIG. 4 is an enlarged diagrammatic view of a cross section of the insulated chassis and circuitry showing certain details of the oxide layer structure as it is believed to exist; and FIG. 5 is a flow diagram indicating certain alternative techniques for constructing printed electrical circuitry employing principles of the invention.

For the purposes of illustration, FIG. 1 represents a sheet metal chassis 10 adapted to support a desired assembly of electronic components and bearing directly thereon and firmly bonded thereto circuits for connecting such components. A set of conductive pathways 12, 14, as indicated in FIG. 1, is disposed on each side of the chassis but occupies only a small area of the chassis.

In accordance with a preferred embodiment of the invention the chassis 10 is formed of an aluminum alloy and bears on both its upper and under surface over substantially the entire area thereof an electrolytically formed oxide coating 16 to which is adherently affixed in electrical pathway patterns a conductive material which may extend through an aperture 18 in the chassis 10 and electrically connect the set 12 of conductive pathways on the upper surface of the chassis to the second set 14 of conductive pathways on the lower surface. The extent of the oxide coating may be controlled by conventional masking techniques and the electrical circuitry may be connected to the base metal, as at aperture 20, which does not contain any oxide coating on its aperture-forming walls so that the conductive material is electrically connected to the metal base which in turn may be grounded as shown at 22.

A typical method of manufacturing the substrate shown in FIG. 1 may be as follows:

(A) A metal sheet 10 of 5052 aluminum alloy .062" in thickness is bent as required and is punched or drilled to provide the through holes 18 required for electrical interconnections between the two sets of circuit pathways 12, 14 to be placed on the chassis. The aluminum surface has a smooth and burr free finish.

(B) The aluminum sheet is firmly racked in accordance with conventional electrolytic techniques and then is thoroughly cleaned, including the steps of:

(1) An immersion in a detergent type cleaner such as Diversey No. 17;

(2) An immersion in a caustic cleaner, such as sodium hydroxide;

(3) An immersion in a de-smut; and (4) An immersion in a dilute nitric acid solution, each immersion being followed by a cold water rinse.

(C) The aluminum sheet is then carefully masked as required by some suitable means well known in the art, for example, wax, tape or some other plating resist over the area where the oxide coating is not desired, taking care not to contaminate the cleaned area which is to be coated.

(D) The sheet is then subjected to an electrochemical conversion operation in a suitable electrolyte to produce the oxide layer 16. A preferred form of process tank 24 is shown in FIGS. 2 and 3 and is described in detail in U.S. Patent No. 2,969,314. The buttons 26 on the inner surface of the tank wall are connected to the negative side of a D.C. current source and function as cathode elements. The sheets 10 to be coated are connected to the positive side of the source through bus bars 28 and function as anodes. The preferred electrolyte 30 in the process tank 24 is 16% sulphuric acid which is maintained at a temperature of 25–30° F. and preferably at 25–27.5° F. The electrolyte is continuously agitated vigorously during the entire oxide layer forming operation as by air bubbled through the bath and/or by mechanical means.

Electrical power is applied to the workpieces in the tank according to the following schedule. The voltage is turned on and slowly increased from 0 to 17 volts over a period of not less than one minute. The voltage is then increased at the rate of two volts a minute until a current density of eighty amperes per square foot of part is reached. This current density is then maintained for thirty minutes, at which time an oxide layer, 0.0037 inch in thickness, is achieved. Different schedules may be employed for different aluminum alloys. For example a maximum current density of only sixty amperes per square foot is employed with a 2024 alloy and forms an oxide layer 0.0019 inch in thickness. Appropriate similar electrical power schedules are employed with other metals and electrolytes.

A sectional diagrammatic view illustrating the nature of this layer as it is presently understood, is shown in FIG. 4. The oxide layer 16 has a multiplicity of minute parallel pores 32 which extend substantially the entire thickness of the layer and which have diameters of less than one micron. Formation flaws 34 which occur at surface irregularities or at corners of the base 10, and crazing defects 36 which are due to the difference in expansivity coefficients of the base metal and the oxide, and become more significant as the sheet is further processed, are also present. While this layer has substantial defects from an electrical standpoint the cold electrolyte, vigorous circulation and careful current density control produce a hard oxide layer that has substantially greater structural superiority than oxide films produced by conventional anodizing techniques.

(E) The coated articles are then removed from the process tank and each is subjected to the following rinse and electrolyte component removal sequence: fifteen minutes in cold running water, three minutes in an ammonium hydroxide solution to neutralize the sulphuric acid, two minutes in cold water, and finally two minutes in hot water. Each coated article is then placed in an oven maintained at 1000° F. for ten minutes during which interval the sulphuric acid components in the pores and flaws are converted to hydrogen sulphide and driven off, thereby removing those contaminating components from pores and flaws. This thermal range (from approximately 30° F. to 1000° F.) produces substantial crazing fracture, exposing the wall surfaces of the oxide at those points which may be structurally weak and removing contaminants from those surfaces. The sheet is then cooled to approximately 150° F. and subjected to an ultrasonic cleaning operation with Bendix Activated Detergent 25–I with subsequent hot water rinse and hot water spray rinse to remove the detergent. The sheet is then dried to remove any residual moisture from the pores 32 and flaws 34, 36.

(F) A solution of silicone resin carrying minute particles of an inorganic insulation material in suspension is then sprayed on the oxide layer to obtain complete and uniform coverage of that layer. The solution is allowed to air dry for twenty minutes and then is baked for one hour at 400° F. to cure the resin to form the characteristic cross-linked silicone structure which secures the inorganic relative to the oxide layer.

The article with the cured silicone is then subjected to a firing cycle which includes a final ten minute period at 1000° F. At this final firing temperature the silicone decomposes and releases its organic constituents leaving a matrix of inorganic material in the pores and flaws of the oxide layer. The residue on the surface of the oxide layer is in flake form and is brushed off to expose the original oxide surface. A preferred spray material is a solution of silicone resin dissolved in 50% xylene which has a viscosity of 150 centipoises at 25° C. and which has natural mica in suspension. A material of this type is commercially available under the designation Isochemcoat 1031MA. The natural mica, an inorganic crystalline compound which has waters of crystallization in the form of hydroxyl anions linked to its crystalline structure, is in minute particles in the order of 0.003 micron in dimension. As this particle size is substantially smaller than published data on the dimensions of the pores 32 it is believed that during the application operation the mica constituents are lodged in the pores and flaws, that they are possibly modified during the curing operation alone or in combination with silicone constituents so that after the high temperature operation an inorganic material 38 is firmly secured in the pores and flaws even though the mica-silica residue on the surface of the oxide layer may be easily brushed off. In any event an oxide coated metal sheet treated in accordance with the above schedule with a silicone resin without the inorganic filler has substantially the same physical and electrical characteristics as the untreated oxide coated sheet, while an oxide coated metal treated with the same silicone resin including this inorganic filler forms an impervious layer of high dielectric quality.

(G) Provision for ground connection is then made by punching or otherwise forming a hole 20 through the oxide layers and the intervening aluminum sheet.

(H) A silver ink 40, such as that commercially available under the designation Du Pont 7713, is then applied in the desired electrical circuitry pattern by conventional screening techniques. This ink pattern is converted to metallic silver by baking the substrate at 400° F. for ten minutes and then at 1000° F. for ten minutes. Any oxide which may have formed on the silver surface is removed by conventional scrubbing techniques after the sheet has been cooled to room temperature.

The printed circuit board may then be treated as desired, including solder dip, electroplate, or electroless plate operations. The circuitry will operate continuously and reliably at the final curing temperature of 1000° F. and intermittently substantially above that temperature. The oxide insulation withstands 2000 volts applied between circuitry and ground in accordance with ASTM D-110-45 testing procedures.

The substrate stock may be of a variety of aluminum alloys, of which the above examples are merely illustrative with a minimum thickness of about fifteen mils. Other metals besides aluminum alloys which are useful in accordance with this invention include magnesium or tantalum sheets which are also oxidizable to form their own oxides in a manner similar to aluminum for subsequent use in accordance with this invention. Their oxides may also be formed in hard films and sealed after being rendered contaminant-free to provide the required electrical insulation characteristics. A wide variety of printed circuit techniques, including metal spray techniques, may be utilized to apply conductive circuit patterns to these substrates. For purposes of further illustration, another example of the application of conductive circuitry to the insulated substrate is:

(a) A thin conductive coating is deposited on all surfaces of the impregnated oxide layer as by copper or silver reduction or the application of a molten metal such as tin.

(b) An electroplating resist is then deposited on the conductive coating on both sides of the panel in a negative or reverse pattern. Such resist can be of any suitable material, for example a natural or synthetic ink or paint, and can be applied by silk or metal screening, photographic exposure, spraying or in a printing press, all as well known in the art.

(c) A predetermined thickness or thicknesses of conductive metal such as copper, nickel, gold, silver, tin-lead solder, rhodium or any combination thereof is then electroplated on all areas of the previously described conductive coating other than those covered by the electroplating resist, using the thin conductive coating as a common ground connection.

(d) The plating resist is then removed by a solvent or stripper and the thin conductive film exposed by the removal of the plating resist is then removed by quick acid etch or solvent stripper.

These steps are outlined in the right hand portion of the flow sheet of FIG. 5.

Uncoated portions of the chassis, if not previously preformed, can then be bent to final chassis configuration and holes punched or drilled therein for use in attachment of the chassis during installation. Lastly, the necessary hardware such as resistors, capacitors, tubes, transistors can then be attached and electrical connections made to the pathway by soldering.

The flow sheet, shown in FIG. 5, is indicative, but not intended to be all-inclusive, of the wide variety of printed circuit application procedures which can follow the basic impervious oxide layer forming steps. The principles of those procedures are well understood in the art as applied either to glass or to fiberboard supports but not necessarily to both. As there indicated, the masking operation prior to oxidation and the masking operation prior to sealing are optional. The conductive material can be applied as shown in the right hand branch of the flow sheet by a variety of methods including the use of firing temperatures up to the melting point of the base metal for bonding or sintering purposes. The insulating or flux coating box refers to spraying or dipping in an insulating varnish to protect the metal circuit pathways from corrosion, etc., or using a varnish which protects and cleans the circuit pathways for subsequent soldering operations. A final encapsulating step comprises potting with a resin or varnish for atmospheric protection of components and wiring. The flow sheet also diagrams an alternative method involving application of a conductive pattern in a positive manner by direct or off-set printing, stenciling, screening, spraying, embossing or brushing.

The use of oxide coated metal as the support has structural advantages as a tough but basically workable material having a hard and rugged bearing surface. The oxide film perferably has a thickness in the order of at least one mil which provides desired structural and electrical characteristics. The disadvantages due to the porous nature of the film, its propensity to craze and the problem of battery action which occurred in certain oxide layer printed circuit configurations are overcome by insuring a contaminant-free oxide layer and disposing particles of electrically insulating inorganic material in each flaw and pore that remain securely attached to the oxide layer during extremes of temperature cycling. No film of additional material remains on the surface of the oxide so that it functions directly as a structural surface.

Metal fabrication operations such as punching, bending and stamping can be used with facility on the structural articles of the invention. In addition, the base metals of these oxide layer insulated articles have good thermal conductivity and hence provide good heat-sinks.

While the oxide coated articles made in accordance with principles of the invention have particular value as printed circuit supports, their potential use is much greater due to the inorganic sealing of the oxide film. Although certain preferred embodiments of the invention have been shown and described, additional modifications in the disclosed embodiment will be obvious to those skilled in the art and it is not intended that the invention be limited thereto or to details thereof and departures may be made therefrom within the spirit and scope of the invention as defined in the claims.

What is claimed is:

1. A method of forming a sealed oxide layer on a base of metal having film forming characteristics comprising the steps of anodically forming a layer of an oxide of said metal on said base,
- applying a silicone material having minute particles of an electrically insulating inorganic material suspended therein to said oxide layer,
- gelling said silicone material by heating said base to a temperature of at least about 400° F.,
- and subsequently further heating said base to a temperature of at least about 1000° F. to decompose said silicone material and form an electrically nonconductive residue, and removing the non-conducting residue from the surface of said oxide layer.

2. A method of forming a sealed aluminum oxide layer on an aluminum alloy base comprising the steps of electrolytically forming an aluminum oxide coating on said base,
- applying a silicone material having minute particles of an electrically insulating inorganic material suspended therein to said aluminum oxide layer,
- gelling said silicone material by heating said base to a temperature of at least about 400° F.,
- subsequently further heating said base to a temperature of at least about 1000° F. to decompose said silicone material and form an electrically nonconductive residue,
- and removing the nonconducting residue from the surface of said oxide layer.

3. A method of forming a sealed oxide layer on a metal base having film forming characteristics
- comprising the steps of electrolytically forming a porous oxide layer on said metal base,
- applying a silicone material having minute particles of mica suspended therein in a film of uniform thickness to said oxide layer,
- heating said base to a temperature sufficient to gel said silicone material,
- subsequently further heating said base to a temperature of at least about 1000° F. to decompose said silicone material and form an electrically nonconductive residue,
- and removing the nonconducting residue from the surface of said oxide layer.

4. A method of making an electric circuit structure comprising the steps of electrolytically forming an oxide on a metal base,
- applying a silicone material having minute particles of an electrically insulating inorganic material suspended therein to said oxide layer,
- gelling said silicone material by heating said base to a temperature of at least about 400° F.,
- subsequently further heating said base to a temperature of at least about 1000° F. to decompose said silicone material and form an electrically nonconductive residue,
- removing the nonconducting residue from the surface of said oxide layer to produce an exposed surface,
- and depositing conductive material in a circuit pattern on the exposed surface of said oxide layer.

5. A method of making an electric circuit structure comprising the steps of electrically forming an oxide coating on an aluminum alloy base,
- applying a silicone material having minute particles of an electrically insulating inorganic material suspended therein to said aluminum oxide layer,
- gelling said silicone material by heating said base to a temperature of at least about 400° F.,
- subsequently further heating said base to a temperature of at least about 1000° F. to decompose said silicone material and form an electrically nonconductive residue,
- removing the nonconducting residue from the surface of said oxide layer to produce an exposed surface of said aluminum oxide layer,
- and depositing conductive material in a circuit pattern on the exposed surface of said aluminum oxide layer.

6. A method of making an electric circuit structure comprising the steps of electrolytically forming a porous oxide layer on a metal base,
- heating said base to a temperature sufficient to drive contaminants from said oxide layer,
- applying a silicone material having minute particles of mica suspended therein to said oxide layer in a film of uniform thickness,
- gelling said silicone material by heating said base to a temperature of at least about 400° F.,
- subsequently further heating said base to a temperature of at least about 1000° F. to decompose said silicone material and form a residue,
- removing any and all of said residue from the surface of said oxide layer to expose the surface thereof,
- and depositing conductive material in a circuit pattern on the exposed surface of said oxide layer.

7. A method of forming an electric circuit structure comprising the steps of electrolytically forming an aluminum oxide layer on an aluminum alloy substrate in an electrolyte solution maintained at a temperature not greater than 30° F.,
- heating said substrate to a temperature sufficient to drive electrolyte components and free moisture from pores and flaws in said oxide layer,
- spraying a silicone material having minute particles of mica suspended therein to said oxide layer,
- heating said substrate to a temperature sufficient to gel said silicone material,
- subsequently heating said substrate to a temperature of at least about 1000° F. to decompose said silicone material to form a residue,
- removing all of said residue from the surface of said oxide layer to expose the surface thereof,
- depositing a metallic ink in a circuit pattern on the exposed surface of said oxide layer,
- and heating said substrate to a temperature of at least about 1000° F. to fire said metallic ink, to form electrically conductive circuits on said substrate.

References Cited by the Examiner

UNITED STATES PATENTS

| | | | |
|---|---|---|---|
| 2,097,300 | 10/37 | Muller | 204—38 |
| 2,157,155 | 5/39 | Work et al. | 204—38 |
| 2,650,903 | 9/53 | Garrison et al. | 204—38 |
| 2,665,243 | 1/54 | Young | 204—58 |
| 2,687,373 | 8/54 | Hering | 204—38 |
| 2,760,925 | 8/56 | Bryant | 204—38 |
| 2,785,098 | 3/57 | Cunningham et al. | 204—38 |
| 2,884,571 | 4/59 | Hannahs | 204—15 |

OTHER REFERENCES

Plastics and Resins, vol. 5, No. 12, 13–18 (1946), Chem. Abst. No. 41: 39997 c.

WINSTON A. DOUGLAS, *Primary Examiner.*

MURRAY TILLMAN, JOHN H. MACK, *Examiners.*